United States Patent [19]

Potter

[11] 4,383,691

[45] May 17, 1983

[54] FLUID SEAL WITH RIB FOR ROTARY SHAFT

[75] Inventor: Charles W. Potter, Manchester, England

[73] Assignee: J. H. Fenner & Co. Ltd., Yorkshire, England

[21] Appl. No.: 385,112

[22] Filed: Jun. 4, 1982

Related U.S. Application Data

[63] Continuation-in-part of Ser. No. 215,858, Dec. 12, 1980, abandoned.

[30] Foreign Application Priority Data

Dec. 21, 1979 [GB] United Kingdom ................. 7944248

[51] Int. Cl.³ ............................................. F16J 15/32
[52] U.S. Cl. .................................. 277/134; 277/153; 277/165; 277/166
[58] Field of Search ............... 277/134, 152, 153, 165, 277/166, 178, 181–184, 189

[56] References Cited

U.S. PATENT DOCUMENTS

| | | | |
|---|---|---|---|
| 2,804,325 | 8/1957 | Riesing | 277/153 |
| 3,489,420 | 1/1970 | Woodling | 277/153 |
| 3,640,542 | 2/1972 | Mowat et al. | 277/134 |
| 4,190,258 | 2/1980 | Arai et al. | 277/153 |

FOREIGN PATENT DOCUMENTS 901976  1/1954  Fed. Rep. of Germany ...... 277/153

*Primary Examiner*—Robert S. Ward, Jr.
*Attorney, Agent, or Firm*—Prutzman, Kalb, Chilton & Alix

[57] ABSTRACT

A shaft-seal assembly is disclosed which includes a thin polytretrafluorethylene sleeve-like member in line sealing contact with the sealing face of a flexible, frustoconical support and through which the sealing pressure of a garter spring and the support is applied to the shaft to be sealed.

14 Claims, 6 Drawing Figures

FLUID SEAL WITH RIB FOR ROTARY SHAFT

This is a continuation-in-part of my pending application Ser. No. 215,858, filed Dec. 12, 1980, and now abandoned.

BACKGROUND OF THE INVENTION

The invention concerns improvements in or relating to seals, and has particular, though not exclusive, reference to seals of the kind employed in sealing the annular gap between a rotary shaft and a housing through which such shaft extends.

The profiles of present day elastomer seals bonded to an "L" section metal shell are a compromise between optimum design and production needs, an essential requirement being a "V" shaped sealing edge radially loaded in contact with the rotary shaft by a close-coiled circular section spring.

Synthetic rubber materials are friction producing, and thus gives rise to a temperature at the sealing edge which is sufficient, in some instances, to give excessive shaft and sealing edge wear.

The oil film thickness under a radial seal lip is of the order of 5 to 20 microns, this giving a meniscus on the sealing surface with no visible fluid leakage to the air side. Over a period of time the sealing surface increases in area with a consequent increase of the meniscus ultimately to a condition where visible leakage occurs.

To counteract this leakage, hydrodynamic fluid return formations of various kinds have been proposed, but although such formations are initially effective, their effectiveness diminishes with increasing wear. In out prior United Kingdom Pat. Nos. 1,382,281 and 1,382,478 there are disclosed hydrodynamic fluid return formations which function when a seal is worn sufficiently to bring the apices of the hydrodynamic fluid return formation into use, the concept embodied in such fluid return formations representing a significant advance over prior art proposals.

With increasing labour costs the demand is for extended seal life, in many instances in excess of the product material remaining consistent in hardness and flexibility, notwithstanding that the use of inhibitors in lubricating oil in many instances results in degradation of the elastomer, and consequential shortening of the effective seal life.

Leather seals have a longer life potential than synthetic rubber, providing the speed and temperature are within the limits for the material, and such seals will function satisfactorily on shafts with a directional lay and roughness unacceptable to synthetic rubber elements. The comparatively wide band of sealing surface of a leather seal resists the ingress of dirt, and other contaminants, but the profile of such seal cannot be simulated satisfactorily in synthetic rubber because of the high torque arising from such a wide band and the resultant seal head distortion and inevitable increase in temperature.

It is known, for example, from U.S. Pat. No. 2,804,325 to provide a polytetrafluoroethylene sleeve through which the pressure of a garter spring, which is located around a frusto-conical elastomeric support, is transmitted to the shaft surface to be sealed. However in the arrangement disclosed the elastomeric support bears over a large area onto the sleeve and in consequence the sleeve bears over a large area onto the shaft surface. In order to provide sufficient bearing pressure to prevent leakage a strong garter spring is required. Due to the large bearing area high wear and running temperatures will result, thus necessitating a relatively thick and inflexible sleeve if frequent replacement is to be avoided. Such a sleeve will not readily follow eccentricities of the shaft and in consequence leakage of the seal can occur. A hydrodynamic wind-back arrangement in the form of a spiral groove is provided, but even under high spring loadings leakage of the fluid through the seal can occur when the shaft is static.

SUMMARY OF THE INVENTION

The object of the present invention is to provide a seal which combines the desirable features of a leather seal with those of an elastomeric seal, and avoids the disadvantages of the aforementioned sleeved seal.

According to the present invention a seal assembly for sealing between relatively movable parts comprises a casing, a moulded, resiliently flexible support mounted in said casing and having a surface directed towards the surface to be sealed, a sleeve-like member through which the said support bears on the surface to be sealed, said support surface having a rib thereon providing substantially line contact between said support surface and said member, and substantially line sealing contact between said member and said surface to be sealed, said member comprising a thin flexible shell of a low friction material, and a garter spring acting on said support substantially in axial alignment with said rib.

The sleeve-like member may be of frusto-conical form and formed of polytetrafluoroethylene or other plastics material of a thickness within the range 0.30 to 0.65 mm. Preferably the member is provided with a hydrodynamic wind-back arrangement which extends on both sides of the location of said line sealing contact between said member and the surface to be sealed, and terminates at a location spaced from the free end of the member whereby static sealing of the seal assembly is not impaired.

BRIEF DESCRIPTION OF THE DRAWINGS

The invention will now be described with reference to the accompanying drawings in which.

DESCRIPTION OF THE PREFERRED EMBODIMENTS

Figure 1:
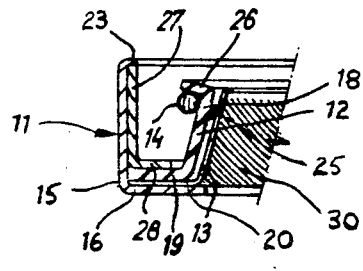
FIG. 1 is a diagrammatic section through a first form of seal assembly constructed in accordance with the invention.
Figure 4:
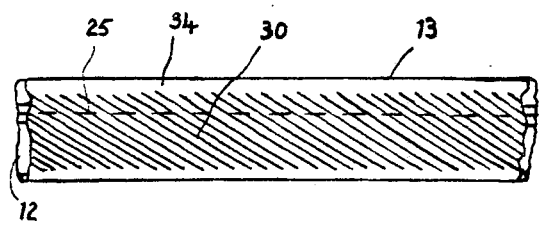
FIG. 4 is a developed elevation of the sleeve of the assembly of FIG. 1.

Referring now to the drawings, and particularly to FIG. 1 thereof, a metal case-seal assembly comprises a casing 11 of L-shaped cross-section, a resiliently flexible seal support 12 of conical, sleeve-like form mounted in said casing, and a low-friction, wear-resistant sleeve 13 at and in contact with the seal support 12 at the inner face thereof, the sleeve 13 being intended for contact with the shaft, not shown, arranged coaxially with the casing in the use condition of the assembly and being loaded into such contact by a close-coiled garter spring 14 provided at that side of the support 12 remote from the sleeve 13.

The casing 11 comprises a cylindrical shell 15 having a radially inwardly directed flange 16 at one end, the inner face of the said flange in closely spaced disposition relative to the cylindrical shell for a purpose hereafter to be made apparent.

The support 12 is of moulded form and comprises a conical body part 18 having a radially outwardly extending flange 19 at its larger diameter end, the support 12 being of synthetic rubber of 60 to 80 IRHD. The outer diameter of the flange 19 is such that, when located in a proper disposition in the casing 11, the outer periphery thereof lies closely adjacent to the cylindrical wall 15 of such casing 11.

The sleeve 13 is, in accordance with the invention, of polytetrafluoroethylene or similar plastics material with low coefficient of friction, and is of constant wall thickness, the thickness suitably lying within the range of from 0.30 to 0.65 mm. The sleeve is of like form to the support 12, and the outside diameter of a flange 20 at the larger diameter end thereof is such that the flange seats on the annular inner face of the inwardly directed flange 16 of the casing with the periphery of the flange closely adjacent to the inner wall of the shell 15. The axial extent of the sleeve 13 exceeds that of the support 12 so as wholly to overlie the same at its inner conical surface, and the support 12 is provided with a rib 25 through which it bears on the sleeve 13 with substantially line contact. The garter spring 14 is located in axial alignment with rib 25. The support 12 and the sleeve 13 are positioned in the casing 11, with flange 20 of the sleeve interposed between flanges 16 and 19, and are maintained in such disposition by a retaining ring 21 acting through a washer 22, the retaining member 27 being held captive in the casing 11 by a swaged overlip 23 at the open end of the casing 11. The retaining member 27 is of generally L-shaped cross-section, and a radial flange 28 thereof serves to locate the support 12 and sleeve 13. We have found that the seal assembly as shown in FIG. 1 provides substantially line sealing contact between the sleeve 13 and the shaft surface and a sealing effect of like kind to that of a leather seal, and that the use of a low-friction sleeve internally of and in combination with a synthetic rubber support provides such contact with minimal temperature differential between the region of the seal and the fluid to be sealed, the flexible synthetic rubber support controlling the sleeve 13 as regards its sealing contact with the shaft and the thin sleeve 13 avoiding any heat transfer problems such as might otherwise arise. Due to there being substantially line contact between the support 12 and the sleeve 13, and with the garter spring 14 being located in axial alignment with the rib 25, adequate loading is provided without the need for a strong garter spring 14. In this way the seal assembly provides good sealing on the rotating shaft but the wear rate and heating is kept to a minimum. In consequence the sleeve 13 may be relatively thin and therefore flexible so as to readily follow any eccentricities of the rotating shaft.

The larger diameter end of the support 12 is formed with an integral outwardly directed flange 26 which serves to locate the garter spring 14 in correct relationship to the rib 25.

Figure 2:
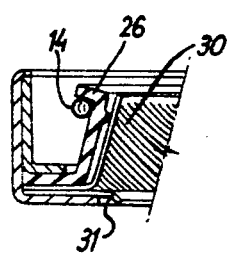
FIGS. 2 and 3 are views similar to FIG. 1 and show alternative embodiments to that shown therein.

If desired, the inner face of the conical sleeve may be provided with a hydrodynamic wind-back arrangement to return leakage fluid to the high pressure environment, whilst a dust lip might also be embodied if desired, such arrangements being indicated in FIG. 2 at 30 and 31 respectively. The hydrodynamic wind-back arrangement 30 comprises a plurality of curved ribs inclined at an acute angle to the axis of the seal assembly, such ribs extending to both sides of the location of the line sealing contact between the sleeve 13 and the shaft. The ribs of arrangement 30 terminate at a location spaced from the free end of the sleeve 13, providing a plain portion 34 to avoid leakage from the seal assembly whilst the shaft is static.

Figure 3:
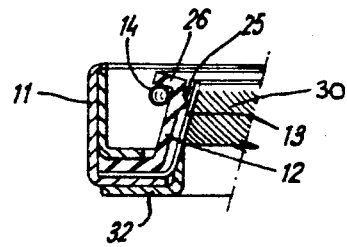

If it is required to reinforce the plastic or polytetrafluoroethylene sleeve in the sealing region, appropriate support can be provided by way of a reinforcing sleeve 32, as shown in FIG. 3, which bears on the sleeve 13 at a position spaced from the location of line sealing contact between the sleeve 13 and the shaft.

The invention is not restricted to the exact features of the embodiments disclosed, since alternatives will readily present themselves to one skilled in the art. The presence or otherwise of a dust lip of the kind shown in FIG. 2, or any other analogous arrangement, is a matter merely of choice, as too is the inclusion of a hydrodynamic return system.

Although, in the embodiments disclosed the sleeve member is of conical form and of constant wall thickness, and includes a radial flange for mounting purposes, sleeve members devoid of one or more of these features may be preferred in some instances. Thus, for example, the sleeve member may be profiled to provide a groove to receive the rib on the support and to present a corresponding rib at the other face of the sleeve. In another arrangement, the sleeve member is located in the assembly merely by co-operation between the rib on the support member and the profiled groove/rib on the sleeve.

It is to be understood that the polytetrafluoroethylene material from which the sleeve is formed may be reinforced with graphite, carbon, fibre glass, metal powders or other material in conventional manner to impart any requisite characteristic to the sleeve.

Although the seal assembly herein proposed is of particular application to the context of sealing between relatively rotatable parts, as for example an axle bearing the embodiments illustrated are suitable for high rotational shaft speeds and it is believed to be of use in high pressure and vacuum systems, this being especially true of the arrangement shown in FIG. 3.

Figure 5:
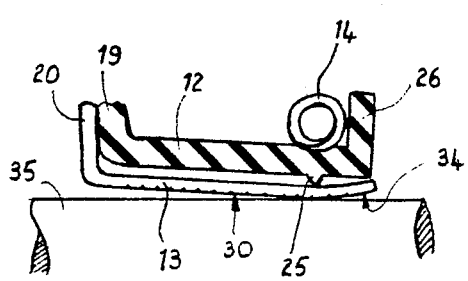
FIGS. 5 and 6 show to a larger scale an axial sectional view of the seal of FIG. 1 in the operational and static modes.

Referring now to FIG. 5 there is shown the seal assembly of FIG. 1 in the operational mode, i.e. with the shaft 35 rotating. In such a situation there is substantially line sealing contact between the sleeve 13 and the shaft 35 at the axial location of the spring 14 and the rib 25. The free end of sleeve 13 is caused to lie clear of the shaft 35 due to the hydrodynamic forces created by the wind-back arrangement 30 and the rotation of the shaft 35.

Figure 6:
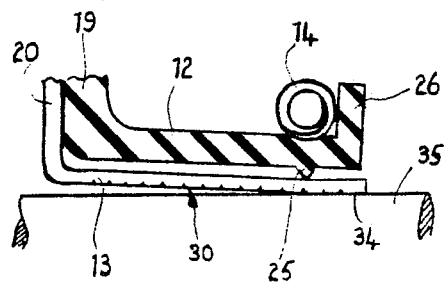

In the static mode, as shown in FIG. 6, the free end of the sleeve 13 contacts the shaft 35 since the abovementioned hydrodynamic forces do not exist. In this configuration the plain portion 34 at the free end of the sleeve 13, to which the wind-back 30 does not extend, provides a seal with the shaft 35 so as to prevent leakage past the seal of the fluid being sealed whilst the shaft 35 is static. The resilience of the sleeve 13 provides the necessary contact pressure between the sleeve 13 and the shaft 35.

What is claimed is:

1. A seal assembly for sealing between relatively movable parts comprising a casing, a moulded, resiliently flexible support mounted in said casing and having a surface directed towards the surface to be sealed, a sleeve-like member through which the support bears on the surface to be sealed, said support surface having a rib thereon providing substantially line contact between said support surface and said member, and substantially line sealing contact between said member and said surface to be sealed, said member comprising a thin flexible shell of low friction material, and a garter spring acting on said support substantially in axial alignment with said rib.

2. A seal assembly as claimed in claim 1, wherein the sleeve-like member is of frusto-conical form and is formed of a plastics material.

3. A seal assembly as claimed in claim 1, wherein the sleeve-like member is of a thickness lying within the range of 0.30 to 0.65 mm.

4. A seal assembly as claimed in claim 1, including co-operating formations on the support and sleeve-like member respectively for axial location of the said member relative to the support.

5. A seal assembly as claimed in claim 4, wherein the sleeve-like member is profiled for co-operation with the said rib on the support axially to locate the member relative to the support.

6. A seal assembly as claimed in claim 1, wherein the sleeve-like member and support include respective radial flanges whereby such elements are secured in a requisite relative axial disposition.

7. A seal assembly as claimed in claim 1, wherein the sleeve-like member is provided radially inwardly of the support.

8. A seal assembly as claimed in claim 1, wherein the sleeve-like member includes an hydrodynamic wind-back arrangement at that surface thereof remote from the support, and extending on both sides of the location of said line sealing contact between said member and the surface to be sealed.

9. A seal assembly according to claim 8 wherein said hydrodynamic wind-back arrangement terminates at a location spaced from the free end of said member.

10. A seal assembly as claimed in claim 1, wherein the material of the sleeve-like member includes a reinforcing material.

11. A seal assembly as claimed in claim 1, wherein the support is adapted to locate said garter spring axially thereof.

12. A seal assembly as claimed in claim 11, wherein the garter spring is provided at that side of the support remote from the sleeve-like member.

13. A seal assembly as claimed in claim 12, wherein the support includes a radial flange for the axial location of the garter spring.

14. A seal assembly as claimed in claim 1, further characterised by a reinforcing sleeve supported in the casing and bearing on the sleeve-like member at that side thereof remote from the support and at a position spaced from the location of said line of sealing contact between said member and said surface to be sealed.

* * * * *